April 15, 1941.         A. Y. DODGE         2,238,583
COUPLING
Filed March 14, 1939
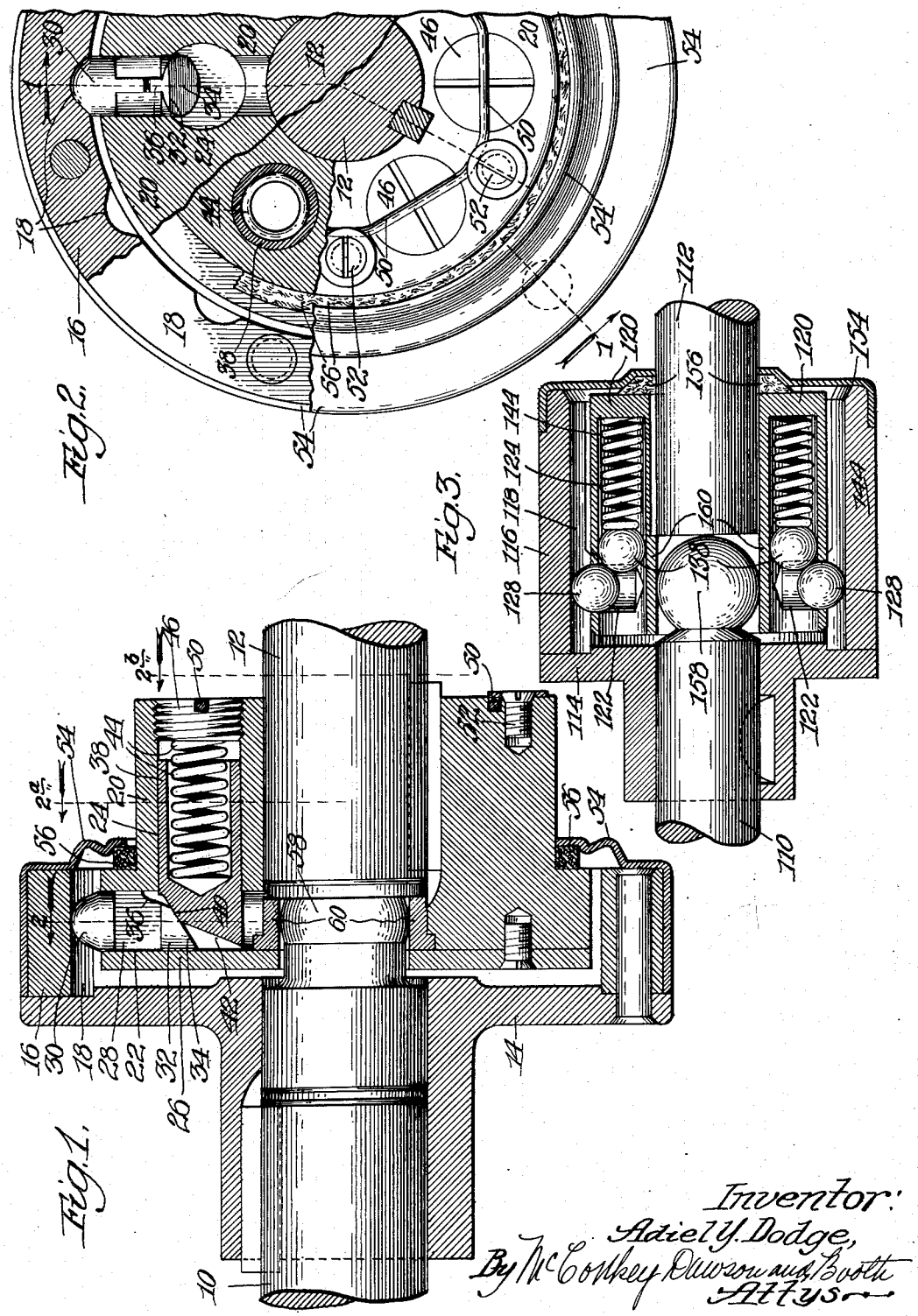

Patented Apr. 15, 1941

2,238,583

UNITED STATES PATENT OFFICE 2,238,583

COUPLING

Adiel Y. Dodge, Rockford, Ill.

Application March 14, 1939, Serial No. 261,787

7 Claims. (Cl. 64—29)

This invention relates to couplings and more particularly to couplings for mechanically transmitting torque.

One of the objects of the invention is to provide a coupling which will release when the torque reaches a predetermined value and will not re-engage until the torque load drops materially below that value. The coupling may, if desired, be so arranged that its release load may be readily adjusted.

Another object of the invention is to provide a coupling which may be adjusted angularly during use.

Other objects of the invention relate to the provision of an extremely simple and inexpensive coupling having a minimum number of parts and which is reliable in operation.

The above and other objects, advantages and novel features of the invention will be apparent from the following description when read in connection with the accompanying drawing, in which:

Figure 1 is a central section of a coupling embodying the invention on the line 1—1 of Figure 2;

Figure 2 is a compound section with parts on the line 2, parts on the line 2a and parts on the line 2b of Figure 1; and Figure 3 is a central section of an alternative construction.

The coupling of Figures 1 and 2 connects a pair of shafts 10 and 12 one of which is a driving shaft and the other a driven shaft. The shaft 10, which is preferably the driving shaft, carries a head 14 having riveted or otherwise secured thereto an axial flange 16 formed with a series of elongated axial grooves 18. The shaft 12 carries a head 20 fitting within the flange 16 and formed with a series of radial guide passages 22 and with intersecting bores 24. One side of the passages 22 may be formed by a detachable plate 26 which also closes the inner ends of bores 24. Passage 22 is preferably rectangular in cross section, while passage 122 is preferably cylindrical.

The flange 18 and head 20 are drivably connected by coupling plunger elements 28 shown as including rounded heads 30 and tapered bases 32 connected by a web portion. The bottom of the bases 32 is cut to form two intersecting surfaces 34 and 36 at different angles with the coupling axis and arranged substantially as shown in Figure 1.

A cam plunger 38 is slidably mounted in the bore 24 and is formed at its forward end with adjacent cam surfaces 40 and 42 at different angles complementary to and engageable with the surfaces 34 and 36 respectively. The cams are urged toward the coupling plungers by coil springs 44 fitting in cut out bores in the cams and seating against screw plugs 46 threaded into the bores 24. By adjusting the plugs 46 the spring tension can be varied and a wire 50 held in place by screws 52 may be provided to hold the screws in adjusted position.

The coupling may be sealed to prevent ingress of dirt or the like or egress of lubricant by a housing 54 secured to the flange 16 carrying a sealing ring 56 in engagement with the head 20.

In use the heads 30 of coupling plungers 28 are normally pressed into the grooves 18 by the action of cams 38, surfaces 34 and 40 being in engagement at this time to provide a high radial pressure on the coupling plungers. The parts are now in driving position and will transmit torque between the shafts 10 and 12. It will be noted that a slight angular misalinement of the shafts 10 and 12 is possible, without interrupting the drive due to the fact that the plungers 28 can slide in the grooves 18. If desired displacement of the shafts can be prevented by providing a ball member 58 axially secured to the head 14 and fitting within a bearing sleeve 60 carried by the head 20.

If the torque load on the coupling increases to a predetermined extent, the camming pressure between the heads 30 and grooves 18 will move the coupling plungers 28 inwardly to move the cams 38 to the right as seen in Figure 1. This will bring the surface 36 into engagement with the cam surface 42 and, due to the angle of these surfaces, a very small outward pressure will be exerted on the coupling plungers. If desired the angle of these surfaces may be made such as to just overcome the friction of the parts so that a very small torque load on the coupling will be sufficient to maintain the coupling plungers cammed in. When the torque load is relieved or sufficiently reduced the coupling plungers will again move out into their driving position. By this construction there is little or no drag on the coupling when it is slipping and very little wear of the parts results but a substantial torque load may be carried when the coupling is in driving condition.

An alternative construction is shown in Figure 3, parts therein corresponding to like parts in Figures 1 and 2 being indicated by the same reference numerals plus 100. Thus construction is much simpler and less expensive than that of Figures 1 and 2 yet operates in much the same manner.

As shown the bores 124 are open at one end and closed at the other and the coupling plungers and cams are replaced by balls 128 and 138. In assembling the parts the balls may be pressed into the open ends of bores 124 behind springs 144 until the ball 128 rises in the guide passage 122 as shown. The head 120 may then be slipped into the flange 116 with balls 128 fitting in the grooves 118 as shown.

In operation the interengaging spherical surfaces of balls 128 and 138 form cam surfaces having different effective cam angles in different positions so that the balls 128 will be urged outward with less pressure when they have been forced in than when they are in driving position.

While two embodiments of the invention have been shown and described in detail, it will be understood that they are illustrative only and are not intended as a definition of the scope of the invention; reference being had for this purpose to the appended claims.

What is claimed is:

1. A torque transmitting coupling comprising rotatable driving and driven members, coupling members movably carried by one of said members and engageable with the other to establish a driving connection therebetween, cam members carried by said one member and engaging the coupling members to urge them into driving position, and resilient means pressing the cam members into engagement with the coupling members, said cam members having surfaces arranged at a plurality of different angles sloping in the same direction from the line of motion of the coupling member and successively engageable with the coupling members in the engaged and disengaged positions thereof to urge the coupling members into driving position with different degrees of force in said different positions.

2. A torque transmitting coupling comprising rotatable driving and driven members, one of said members being formed with a depression therein, a coupling member slidably carried by the other of said members and adapted to fit into said depression to establish a driving connection between the members and to be cammed out of said depression upon the establishment of a predetermined torque between the members, and a cam member engageable with said coupling member to urge it into the depression and having a plurality of cam surfaces at different angles sloping in the same direction from the line of motion of the coupling member and successively engageable with the coupling members in the engaged and disengaged positions thereof to urge the coupling member toward its driving position with less force when it is out of the depression than when it is in the depression.

3. A torque transmitting coupling comprising rotatable driving and driven members, one of said members having an axially extending flange formed with an axially extending groove therein, the other member being formed with a radial guide passage and an intersecting axial bore, a coupling member slidable in said guide passage and engageable with said groove to form a driving connection between the members, a cam in said bore engageable with the coupling member and having cam surfaces at different angles sloping in the same direction from the line of motion of the coupling member and successively engageable with the coupling members in the engaged and disengaged positions thereof to urge the coupling member toward the groove with different degrees of force in different positions, and resilient means in the bore to urge the cam toward the coupling member.

4. A torque transmitting coupling comprising rotatable driving and driven members, one of said members having an axially extending flange formed with an axially extending groove therein, the other member being formed with a radial guide passage and an intersecting axial bore, a coupling plunger slidable in said guide passage and having a rounded end to fit in said groove, a cam plunger slidable in said bore and formed at one end with adjacent cam surfaces at different angles sloping in the same direction from the line of motion of the coupling member successively engageable with the coupling plunger to urge it toward the groove with different degrees of force in different positions, and resilient means in the bore urging the cam plunger toward the coupling plunger.

5. A torque transmitting coupling comprising rotatable driving and driven members, one of said members having an axially extending flange formed with an axially extending groove therein, the other member being formed with a radial guide passage and an intersecting axial bore, a coupling plunger slidable in said guide passage and having one end rounded to fit in said groove, and its other end formed with intersecting surfaces at different angles, a cam plunger slidable in said bore and formed at one end with adjacent cam surfaces at different angles engageable respectively with the intersecting surfaces on the plunger to urge it toward the groove with different degrees of force in different positions, and resilient means in the bore urging the cam plunger toward the coupling plunger.

6. A torque transmitting coupling comprising rotatable driving and driven members, one of said members having an axially extending flange formed with an axially extending groove therein, the other member being formed wtih a radial guide passage and an intersecting axial bore, a spherical ball slidable in said guide passage and engageable with the groove to form a driving connection between said members, a second ball slidable in said bore and engaging the first named ball to cam the first named ball toward the groove, and resilient means urging the second ball toward the first ball.

7. A torque transmitting coupling comprising rotatable driving and driven members, one of said members having an axially extending flange formed with an axially extending groove therein, the other member being formed with a radial guide passage and an intersecting axial bore, a coupling element slidable in said passage and engageable with said groove, a cam in said bore urging the coupling element into engaging position, and ball and socket means connecting the members to prevent lateral displacement thereof while permitting angular movement.

ADIEL Y. DODGE.